United States Patent [19]
Colletta et al.

[11] Patent Number: 5,546,747
[45] Date of Patent: Aug. 20, 1996

[54] DEVICE FOR THE PRECIPITATION OF PARTICULATE IN EXHAUST GASES

[75] Inventors: Angelo Colletta; Medardo Pinti, both of Rome, Italy

[73] Assignee: Centro Sviluppo Materiali S.p.A., Rome, Italy

[21] Appl. No.: 168,154

[22] Filed: Dec. 17, 1993

[51] Int. Cl.[6] .................................................... F01N 3/20
[52] U.S. Cl. ............................. 60/275; 60/303; 96/48
[58] Field of Search ...................... 60/275, 303; 96/48, 96/52, 61, 62, 64, 71, 72, 73, 96

[56] References Cited

U.S. PATENT DOCUMENTS

| | | | |
|---|---|---|---|
| 3,440,800 | 4/1969 | Messen-Jaschin | 60/275 |
| 3,483,671 | 12/1969 | Wiemer . | |
| 3,979,193 | 9/1976 | Sikich | 60/275 |
| 3,979,905 | 9/1976 | Masaki | 60/303 |
| 4,247,307 | 1/1981 | Chang . | |
| 4,587,807 | 5/1986 | Suzuki . | |
| 4,587,808 | 5/1986 | Watanabe et al. . | |
| 4,741,746 | 5/1988 | Chao et al. . | |
| 4,989,408 | 2/1991 | Leonhard | 60/303 |
| 5,199,257 | 4/1993 | Colletta et al. . | |
| 5,263,317 | 11/1993 | Watanabe et al. . | |

FOREIGN PATENT DOCUMENTS

| | | |
|---|---|---|
| 0083845 | 7/1983 | European Pat. Off. . |
| 4114935 | 11/1991 | Germany . |
| 792603 | 4/1958 | United Kingdom . |

Primary Examiner—Ira S. Lazarus
Assistant Examiner—Daniel J. O'Connor
Attorney, Agent, or Firm—Oliff & Berridge

[57] ABSTRACT

Device for the precipitation of carbon particles present in exhaust gases having a voltage generator whose poles are connected with at least one electrode and the shell comprising separate internal zones where the following phenomena take place mixing of exhaust gas with air in a first zone, ionization in a second zone of the gas & air mixture coming from said first zone, ignition and precipitation in a third zone of said carbon particles present in said gas & air mixture coming from said second zone, and exhaust of the gas in which said carbon particles have been precipitated.

21 Claims, 3 Drawing Sheets

DEVICE FOR THE PRECIPITATION OF PARTICULATE IN EXHAUST GASES

DESCRIPTION

1. Field of the Invention

In the combustion of carbonrich substances there is often abundant emission of carbon dust particles (particulate) due to lack of air in the mixture to be burnt or even to mixing defects.

In accordance with the present invention the particulate is precipitated by means of a system consisting of at least one electrode connected to a pole of a voltage generator while the other pole is connected to the outer shell of the device. Between the two poles is established a strong difference of potential. The carbon particles pass between said at least one electrode and the outer shell of the device and thus cause discharges between the conductors and the particles which are brought to incandescence and burned.

2. Prior Art

The present invention relates to a device for precipitation of particulate in exhaust gases and more specifically a system of eliminating or at least reducing considerably the emission of particulate from diesel engines or from all those applications in which hydrocarbons are burnt such as diesel fuel or heavier, even in mixtures with an aromatic fraction such as heating plants, portable generators, large power plants, etc., or coal. Even though for the sake of simplicity diesel engines are referred to hereinafter the remarks set forth and the conclusions reached refer and apply to the other applications. From the combustion of hydrocarbons, already starting from molecules with about ten carbon atoms or simple aromatic molecules, there are obtained in addition to conventional combustion products such as $CO$, $CO_2$ and $H_2O$ also other products such as unburned organic compounds, carbon dust and nitrogen oxides. This also applies, at least as concerns the emission of carbon dust, to coal combustion.

The composition of exhaust gas can vary considerably depending on the quantity of air employed in combustion. However, for good process yield, e.g. to achieve sufficient power, the ratio of air to fuel is fixed around certain values for which it is difficult to avoid some particulate emission.

The phenomenon is particularly visible in diesel engines for vehicles, which are therefore accused of being highly polluting and harmful to public health.

In principle these accusations are largely unfounded. Indeed, compared with petrol (gasoline) engines diesels emit from four to six times less carbon monoxide, (which is very toxic because it stops the exchange between blood and oxygen), about half that of unburned hydrocarbons, which are extremely carcinogenic, and about half that of nitrogen oxides, which are among the causes of acid rain.

But diesel engines emit about forty times more carbon particles, which in the long run can cause bronchial and lung afflictions, and sulphur oxides, which are also causes of acid rain and could be eliminated by desulphurizing diesel fuel in the same manner as gasoline.

In addition it should be noted that the carbon dust adsorbs unburned hydrocarbons and hence acts as a vehicle for these carcinogenic agents.

Summing up, it is incontrovertible that the carbon dust emitted by burning diesel fuel, fuel oils and related substances is at best extremely unpleasant and therefore emission thereof should be eliminated or at least considerably reduced.

A certain reduction in the amount of smoke from hydrocarbons can be achieved by electronic combustion control. This control clan however permit a reduction of smoke by 20% which is insufficient for many applications.

Much effort has therefore been made towards solving the problem.

U.S. Pat. No. 4,741,746 suggests the use of an electrostatic precipitator with corona effect to precipitate the carbon particles from diesel exhaust gas.

U.S. Pat. No. 4,587,808, again for diesel engines, calls for the use of a molecular dissociator which, with a charge up to 150 kV, causes dissociation of the molecules of $CO$, $CO_2$, $NOx$ and unburned hydrocarbons in the constituent chemical elements and subsequent precipitation of the carbon dust thus produced and of that present in the exhaust gas by means of an electrostatic precipitator and a cyclone.

Applicants have invented a device for precipitation of particulate (Italian Patent No. 1,230,455) characterised by the combination in a co-operative relationship of the following parts:

a high voltage generator with two poles, a plurality of conductors connected alternately to one or the other of said poles, means for introducing air into the piping upstream of said conductors, and means for regulating said means of air introduction.

Said conductors are made up each of a metallic grid arranged inside the exhaust pipe perpendicular to the general direction of motion of the exhaust gases.

In the practical operation of these devices there were found problems due mainly to not completely homogeneous mixture of the exhaust gases with air and a not entirely optimised capacity of the electrically charged elements to act effectively on the particulate.

SUMMARY OF THE INVENTION

From the foregoing it is clear that the technical and economic problems connected with smoke precipitation in exhaust hydrocarbon gases for applications of limited individual capacity, e.g. diesel engines for transport or domestic heating plants, have not been solved.

The purpose of the present invention is to overcome the shortcomings of existing particulate precipitation systems by providing a simple, compact and economical device for the reduction of emission of particulate in exhaust hydrocarbon gases.

The present invention relates to a device for the precipitation of carbon particles present in exhaust gases having a voltage generator whose poles are connected with at least one electrode and the shell of the device comprising separate zones where the following phenomena in a co-operation link take place:

mixing of exhaust gas with air in a first zone, ionization in a second zone of the gas & air mixture coming from said first zone, ignition and combustion in a third zone of said carbon particles present in said gas & air mixture coming from said second zone, and exhaust of the gas in which said carbon particles have been precipitated.

DETAILED DESCRIPTION OF THE INVENTION

The present invention is now described in greater detail with reference to the annexed figures which illustrate merely by way of nonlimiting example the purposes and scope of the invention. In the annexed figures only the details necessary for understanding the device which is the object of the present invention have been numbered while nonessential details have been omitted.

Figure 1:
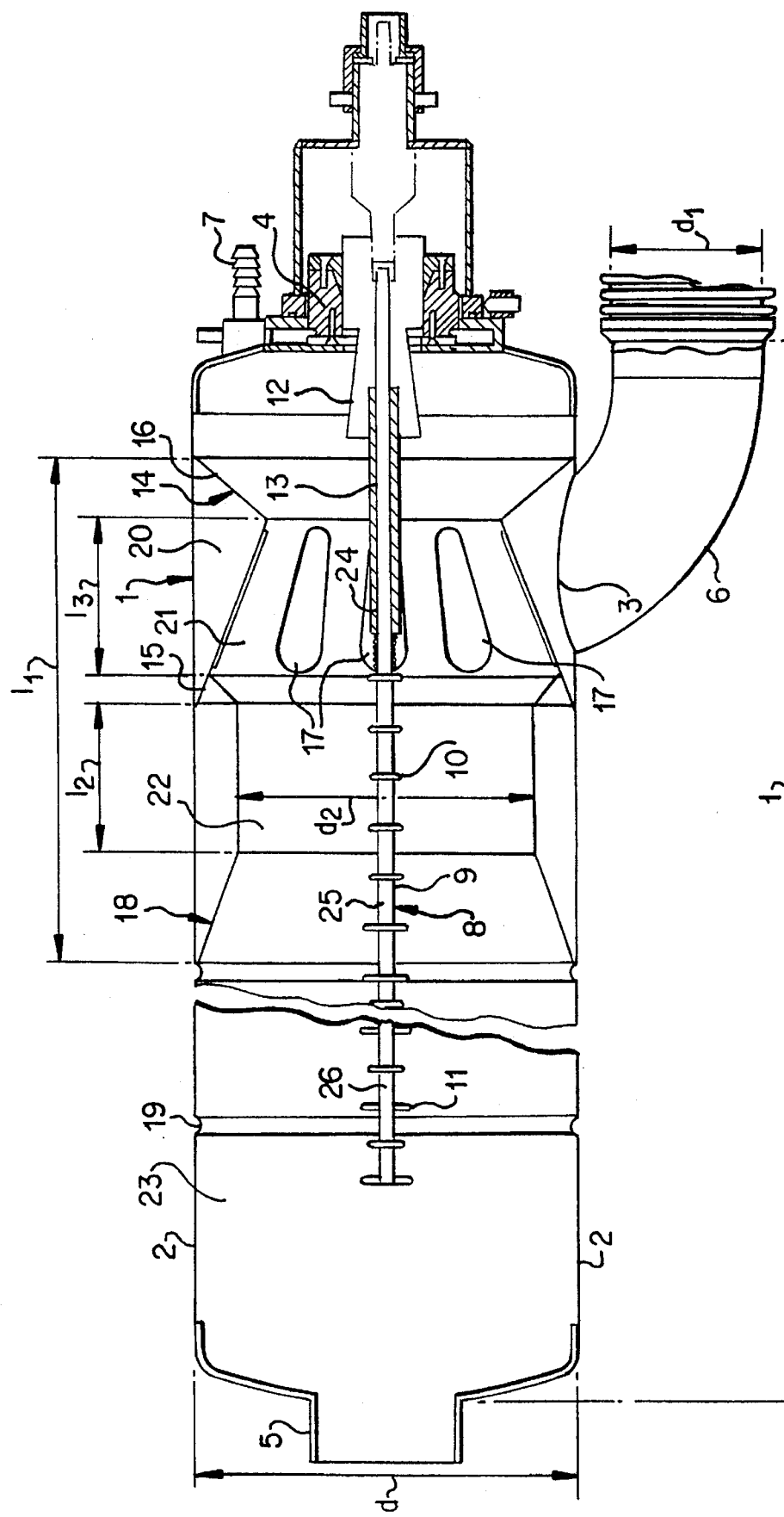
FIG. 1 shows the entire device which is the object of the present invention.

FIG. 1 shows the device 1 which is the object of the present invention consisting of an external shell 2 of metallic material in which are provided the opening 3 for inlet of exhaust gases coming from the duct 6, the opening 4 through which enters the air coming from the duct 7 designed to complete combustion of the particulate inside the device, and the opening 5 for removal of the exhaust gases which have undergone the particulate precipitation treatment.

The opening 4, in addition to allowing as set forth above inlet of air, permits passage of at least one electrode 8 which is mounted on an insulator 12 whose longitudinal cross section is advantageously in dovetail form and of quartz. The base of the electrode opposite the mixing zone is protected by an insulating tube 13 also advantageously of quartz which prevents the carbon particles from being electrically charged. Because of this particular arrangement the air impinges on the insulator 12 and the insulating tube 13 for their entire length and prevents deposit thereon of carbon particles which could form short circuits between the electrode 8 and the outer shell 2 charged with opposite polarity, thus reducing the overall efficiency of the device.

Without going beyond the scope of the present invention, instead of the single electrode 8 shown in the figures it is possible to provide a plurality of electrodes.

Figure 4:
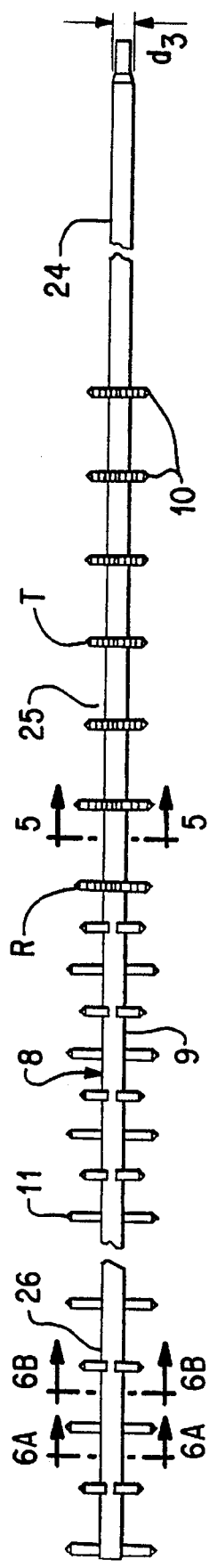
FIG. 4 shows the electrode used in the device which is the object of the present invention.
Figure 5B:
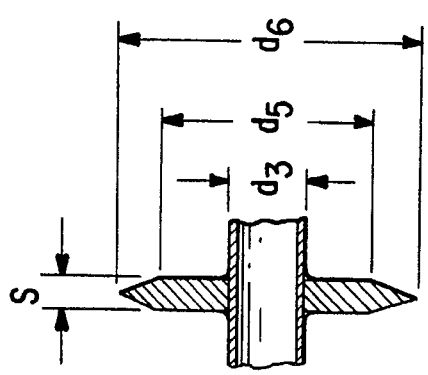
FIG. 5 shows an enlarged cross section C—C of the electrode shown in FIG. 4.
Figure 5A:
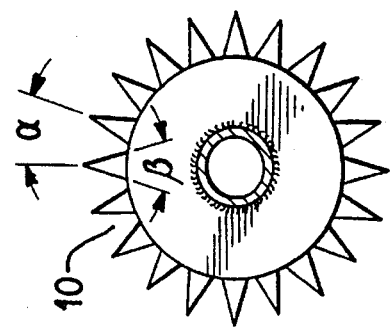
Figure 6B:
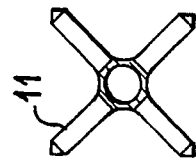
FIG. 6 shows the enlarged cross sections AA and BB of the electrode shown in FIG. 4.
Figure 6A:
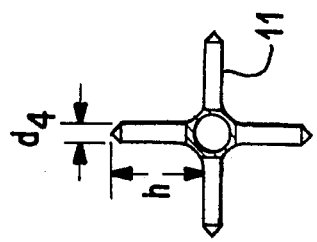

The electrode 8 comprises a bar 9 of metallic material and there can be distinguished a first part 24 protected by the insulator 12 and the insulator tube 13, a second part 25 on which are mounted elements 10 advantageously in ring form and a third part 26 on which are mounted elements 11 advantageously in pointed form (see also FIGS. 4, 5, and 6).

Inside the shell 2 is provided an element 14 also of metallic material. In a preferred embodiment, element 14 comprises two inverted truncated cone surfaces 15 and 16. The element 14 together with a part of the shell 2 defines an annular duct 20.

Figure 3:
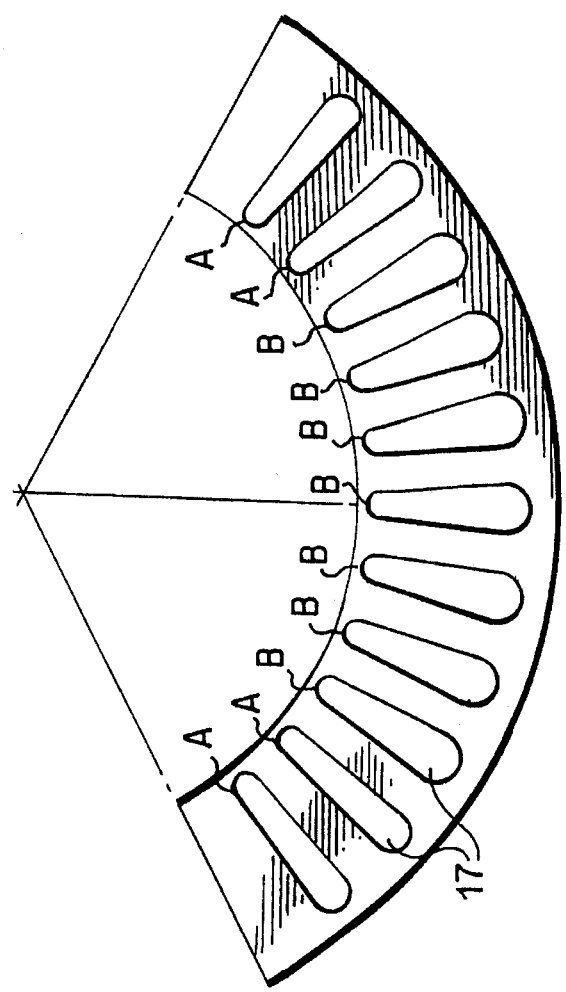
FIG. 3 develops a detail of FIG. 2.
Figure 2:
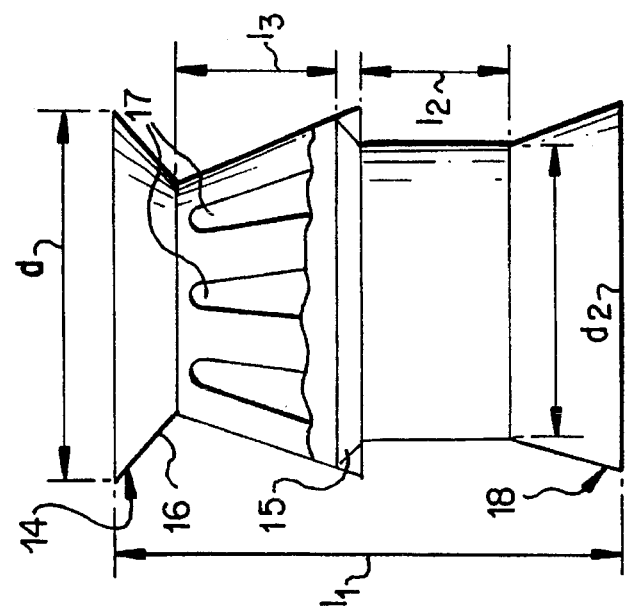
FIG. 2 shows two elements represented in FIG. 1.

In the truncated cone surface 15 there are ports 17 in slot form whose width increases progressively as the port 17 lengthens away from the exhaust gas inlet opening 3 in the outer shell 2 (see also FIGS. 2 and 3). This particular arrangement causes the exhaust gases to be distributed in a uniform manner in the annular duct 20 and prevents their giving priority to the ports 17 nearest the inlet opening 3, massing in these zones and hence not allowing their homogeneous mixing with the air coming from the opening 4, mixing which takes place in the internal zone 21 of the element 14 and opposite the first part 24 of the electrode 8.

As may be seen in FIG. 1, in this particular embodiment of the device which is the object of the present invention the direction of arrival of the exhaust gases in the device is perpendicular to the direction of arrival of the air.

The quantity of air necessary for complete combustion of the particulate can be controlled by the usual means (probes, valves, electronic control unit), not shown in the figures. In addition to the element 14 inside the shell 2 is housed another element 18 advantageously in the form of a venturi. At this element 18 in the zone 22 takes place ionization of the mixture of exhaust gases & air produced first as mentioned at the mixing zone 21. Ionization of the mixture is facilitated by the elements 10 advantageously being in ring form mounted on the second part 25 of the electrode 8.

Once ionized the mixture flows toward the third part 26 of the electrode 8 provided with pointed elements 11, i.e. towards the zone 23 where the carbon particles, because of the high voltage, e.g. 50 kV to 100 kV, established between the points 11 and the outer shell 2 of the device 1 are brought to incandescence and burned. Indeed, when the mixture flows between the electrodes, the carbon dust in it lowers the dielectric constant of the system and on the carbon particles is discharged a powerful spark, making incandescent the carbon particles which thus burn.

At the zone 23 are provided grooves 19 which aid the deposit of carbon particles which, surprisingly, facilitate the discharges and at the same time protect the metallic surface.

Summarizing, it may be said that treatment of exhaust gases for elimination of carbon particles (particulate) consists of the following phases:

a) the exhaust gases coming from the duct 6 are mixed in a uniform manner with the air in the zone 21, i.e. air input at the base of the electrode 8; to improve mixing of exhaust gas and air there are provided on the element 14 at the truncated cone surface 15 ports 17 whose width increases with the increase in the distance from the inlet opening 3 of the exhaust gases in the outer shell 2 (FIG. 3); at the zone 21 the first part 24 of the electrode 8 is protected by the insulator 12 and the insulating tube 13 which are both advantageously of quartz;

b) the mixture thus formed flows towards the ionization zone 22 where the second part 25 of the electrode 8 is housed and on which are located the ring elements 10; the element 18 advantageously in the form of a venturi regulates the flow of mixture;

c) the ionized mixture flows towards the zone 23 in which is housed the third part 26 of the electrode 8 provided with pointed elements 11 which aid the discharges designed for combustion of the carbon particles; and d) the mixture purified of the carbon particles is removed through the opening 5.

Compared with the devices of the known art the present invention has the following advantages:

absence of carbon deposits at the base of the electrode 8 opposite the insulator 12 which could aid formation of short circuits between the electrode 8 and the shell 2;

precise delimitation of a first zone 21 for gas and air mixing, a second zone 22 for ionization of the mixture and a third zone 23 for ignition and combustion of the particulate.

FIG. 2 shows in detail the elements 14 and 18 made advantageously from a single piece of metallic material. The diameter d of the external shell 2 and its length l are chosen so that d/l is between ⅕ and ⅙. Similarly with reference to FIGS. 1 and 2 the following relationships are preferred.

$$1/5 \leq l_1/l \leq 1/4 \qquad 1/3 \leq d_1/d \leq 1/2$$
$$1/4 \leq l_2/l_1 \leq 1/3 \qquad d_2 = 2\, l_2$$
$$1/4 \leq l_3/l_1 \leq 1/3$$

where:

$l_1$ is the sum of the lengths of the element 14 and the element 18 advantageously in venturi form;

$d_2$ and $l_2$ are the diameter and length respectively of the groove of the element 18 advantageously in venturi form;

$l_3$ is the length of the projection on the plane of symmetry of the truncated cone surface 15 in which are located the ports 17; and $d_1$ is the diameter of the duct 6 for feeding of the exhaust gases to the device 1.

FIG. 3 takes into consideration two series A,B of ports 17 having different sizes for the inlet of exhaust gases in the zone 21 for mixing with air. Applicants found that to have technically appreciable results the width of the ports 17 of type B should be 20% to 30% greater than the width of the ports 17 of type A.

As may be seen by examining FIGS. 4 and 5 there can be provided two series R,T of ring elements 10. The type R series, while having the same shape as the type T series, has slightly greater size. The ring elements 10 consist of a circular base from which project a multiplicity of points. Applicants have found that, in order to have good ionization of the mixture, the angle α included between two contiguous projecting points of the ring element 10 must be between 15° and 20° and that the size of the angle β formed by a side of the point with the centre line should also be between 15° and 20°. The dimensions s, d3, d5 and d6 shown in FIG. 5 preferably satisfy the following relationships:

$$1/3\, d_3 \leq s \leq 1/2\, d_3 \qquad 1/3\, d_5 \leq d_3 \leq 1/2\, d_5$$
$$1/4\, d_6 \leq d_3 \leq 1/3\, d_6$$

where s is the thickness of each ring element, $d_6$ is the diameter of each ring element at the tip of each point, $d_5$ is the diameter of each ring element at the base of each point, and $d_3$ is the diameter of the metallic bar.

Also for the pointed elements 11 on the third part 26 of the electrode 8 were obtained the following preferred values (FIG. 6):

$$1/4\, d_3 \leq d_4 \leq 1/3\, d_3 \qquad 1/6\, h \leq d_4 \leq 1/5\, h$$

where $d_4$ is the diameter of the pointed element 11 and h its height.

To give greater effectiveness to the part 26 of the electrode 8 each group of four pointed elements 11 is staggered in relation to the two adjacent ones as shown in FIG. 6.

Table I shows some experimental data obtained by the applicant.

Said data were obtained with a 2500 cc diesel engine.

In the first line from the bottom are set forth for comparison the maximum values admitted by United States standards FTP 75 cycle-USA-California.

As may be seen from table, if the device which is the object of the present invention is used, there is a considerable reduction in the quantity of particulate emitted to the atmosphere.

The efficiency indicates what percentage of particulate was destroyed by combustion with a device such as that which is the object of the present invention compared to the quantity of particulate produced without any filtering device. The quantities of NOx, CO, HC and particulate are expressed in grams per mile travelled by the engine.

TABLE I

| | NOx | CO | HC | PM | Efficiency |
| --- | --- | --- | --- | --- | --- |
| | | grams/mile | | | % |
| 1st test without device | 0.79 | 1.16 | 0.20 | 0.11 | — |
| 2nd test without device | 0.83 | 1.01 | 0.17 | 0.11 | |
| 1st test with device | 0.83 | 1.08 | 0.19 | 0.08 | 27.3 |
| 2nd test with device | 0.85 | 1.02 | 0.19 | 0.07 | 36.4 |
| 3rd test with device | 0.95 | 0.99 | 0.18 | 0.067 | 39.1 |
| 4th test with device | 0.94 | 0.98 | 0.15 | 0.056 | 49.1 |
| 1994 U.S. limits | 1.0 | 3.4 | 0.25 | 0.08 | — |

We claim:

1. A device for precipitation of the particulate in exhaust gases comprising:

an outer shell of metallic material, means for introduction of air into said outer shell, means for introduction of said exhaust gases into said outer shell, a voltage generator with one pole connected to an electrode and the other to said outer shell, a first zone for mixing said air with said exhaust gas, a second zone for ionization of said mixture coming from said first zone, and a third zone for ignition and combustion of said particulate present in said mixture coming from said second zone wherein said means for introduction of said exhaust gases comprises a duct, an inlet opening in said outer shell for receiving exhaust gases from said duct, and an annular duct surrounding said first zone and including a plurality of ports.

2. A device as claimed in claim 1 wherein said means for the introduction of said air comprises a duct and an opening in said outer shell and said air impinges on a base of said electrode.

3. A device as claimed in claim 1 wherein said annular duct comprises a part of said outer shell and two inverted truncated cone surfaces.

4. A device as claimed in claim 3 wherein said ports are located in said truncated cone surface of said annular duct and are in the form of slots.

5. A device as claimed in claim 4 wherein the width of said ports increases directly with their distance from said inlet opening in said outer shell.

6. A device as claimed in claim 5 including two sets of ports having different widths, the widths of one set of ports being 20% to 30% greater than the widths of the other sets of ports.

7. A device as claimed in claim 1 wherein there is an element in venturi form at said second zone.

8. A device as claimed in claim 1 wherein said electrode comprises a bar of metallic material which is divided into a first part opposite said first mixing zone, a second part opposite said second mixture ionization zone, and a third part opposite said third zone for ignition and combustion of said particulate.

9. A device as claimed in claim 1 including grooves on at least one part of said shell opposite said third zone.

10. A device as claimed in claim 1 wherein a diameter d of said outer shell and a length l of the outer shell satisfy the following relationship:

$$1/6 \leq d/l \leq 1/5.$$

11. A device as claimed in claim 1, comprising an annular duct section of length $l_1$ which includes a truncated cone section of length $l_3$ and a venturi section including an ionization zone of length $l_2$ and diameter $d_2$, and wherein the following relationships are satisfied:

$$1/5 \leq l_1/l \leq 1/4 \qquad 1/3 \leq d_1/d \leq 1/2$$
$$1/4 \leq l_2/l_1 \leq l_1 \qquad d_2 = 2\, l_2$$
$$1/4 \leq l_3/l_1 \leq 1/3$$

where d is the length of said outer shell, l is the length of said outer shell, and $d_1$ is the diameter of said means for introduction of said exhaust gases.

12. A device for precipitation of the particulate in exhaust gases comprising:
- an outer shell of metallic material,
- means for introduction of air into said outer shell,
- means for introduction of said exhaust gases into said outer shell,
- a voltage generator with one pole connected to an electrode and the other to said outer shell,
- a first zone for mixing said air with said exhaust gases,
- a second zone for ionization of said mixture coming from said first zone,
- a third zone for ignition and combustion of said particulate present in said mixture coming from said second zone,
- said electrode comprising a bar of metallic material which is divided into a first part opposite said first mixing zone, a second part opposite said second mixture ionization zone, and a third part opposite said third zone for ignition and combustion of said particulate.

13. A device as claimed in claim 12 wherein said first part of said electrode is protected by an insulator and an insulating tube.

14. A device as claimed in claim 13 wherein said insulator has a longitudinal cross section in dovetail form and said insulator and said insulating tube are of quartz.

15. A device as claimed in claim 12 wherein ring elements are mounted on said second part of said electrode.

16. A device as claimed in claim 15 wherein each ring element comprises a circular base and a multiplicity of points.

17. A device as claimed in claim 16 wherein the angle $\alpha$ included between two contiguous points is 15°–20° and the angle $\beta$ formed by a side of each point and the center line of each point is 15°–20°.

18. A device as claimed in claim 16 wherein the dimensions of said ring elements and the diameter of said metallic bar of said electrode have the following relationships:

$$1/3\, d_3 \leq s \leq 1/2\, d_3 \qquad 1/3\, d_5 \leq d_3 \leq 1/2\, d_5$$
$$1/4\, d_6 \leq d_3 \leq 1/3\, d_6$$

where s is the thickness of each ring element, $d_6$ is the diameter of each ring element at the tip of each point, $d_5$ is the diameter of each ring element at the base of each point, and $d_3$ is the diameter of the metallic bar.

19. A device as claimed in claim 15 wherein said ring elements include two sets of ring elements having different dimensions.

20. A device as claimed in claim 12 wherein in said third part of said electrode comprises mounted pointed elements.

21. A device as claimed in claim 20 wherein the dimensions of said pointed elements and the diameter of the bar satisfy the following relationships:

$$1/4\, d_3 \leq d_4 \leq 1/3\, d_3 \qquad 1/6\, h \leq d_4 \leq 1/5\, h$$

where $d_4$ is the diameter of each pointed element, $d_3$ is the diameter of the metallic bar, and h is the height of each pointed element.

* * * * *